United States Patent [19]

Schöder et al.

[11] Patent Number: 5,515,956
[45] Date of Patent: May 14, 1996

[54] HYDROKINETIC TORQUE CONVERTER

[75] Inventors: Bernd Schöder, Münnerstadt; Johannes Sossnitza, Unterspiesheim; Jürgen Demgensky, Schweinfurt; Josef Riedmann, Arnstein; Horst Jädicke, Gochsheim; Wilfried Glock, Dittelbrunn-Hambach, all of Germany

[73] Assignee: Fichtel & Sachs AG, Schweinfurt, Germany

[21] Appl. No.: 263,995

[22] Filed: Jun. 22, 1994

[30] Foreign Application Priority Data

Jun. 23, 1993 [DE] Germany .......................... 43 20 769.3

[51] Int. Cl.⁶ .......................... F16H 45/02; F16H 41/24
[52] U.S. Cl. .................. 192/3.29; 192/110 B; 60/330; 60/345
[58] Field of Search .................. 192/3.28, 3.29, 192/3.3, 110 B; 60/330, 341, 345, 361, 362

[56] References Cited

U.S. PATENT DOCUMENTS

| | | | |
|---|---|---|---|
| 3,338,358 | 8/1967 | Christenson et al. | 192/3.3 |
| 4,049,093 | 9/1977 | Vukovich et al. | 192/3.3 |
| 4,540,076 | 9/1985 | Bopp . | |
| 4,665,693 | 5/1987 | Misu et al. | 60/330 |
| 4,924,977 | 5/1990 | Crawford et al. . | |
| 5,103,947 | 4/1992 | Okuzumi . | |
| 5,215,173 | 6/1993 | Gimmler | 192/3.3 |
| 5,282,362 | 2/1994 | Renneker et al. . | |

FOREIGN PATENT DOCUMENTS

| | | |
|---|---|---|
| 0008736 | 3/1980 | European Pat. Off. . |
| 0070662 | 1/1983 | European Pat. Off. . |
| 3823210 | 1/1990 | Germany . |
| 1592489 | 7/1981 | United Kingdom . |
| 2172348 | 9/1986 | United Kingdom . |

*Primary Examiner*—Richard M. Lorence
*Attorney, Agent, or Firm*—Nils H. Ljungman & Associates

[57] ABSTRACT

Hydrokinetic torque converter, including a housing driven by an internal combustion engine with a housing wall near the drive which is provided with a concentric guide hub, a pump wheel integrated into the housing wall away from the drive, a turbine wheel located between the pump wheel and the housing wall near the drive, which turbine wheel is non-rotationally connected by means of a turbine wheel hub to the output, possibly a stator located between the two, whereby the turbine wheel and/or the pump wheel are provided with axial bearings opposite the stator, and whereby the walls of the pump wheel and/or of the turbine wheel pressurized with axial pressure are provided on their radially inside diameter with mountings for fastening the axial bearings.

20 Claims, 2 Drawing Sheets

HYDROKINETIC TORQUE CONVERTER

FIELD OF THE INVENTION

This invention generally relates to a hydrokinetic torque converter with lock-up clutch. The torque converter generally includes a housing driven by an internal combustion engine, the housing having a housing wall near the drive of the internal combustion engine, which housing wall is provided with a concentric guide hub. The torque converter also includes a pump wheel integrated into the housing wall away from the drive of the internal combustion engine, a turbine wheel located between the pump wheel and the housing wall near the drive of the internal combustion engine, which turbine wheel is non-rotationally connected by means of a turbine wheel hub to the output. The torque converter also generally includes a stator located between the turbine wheel and the pump wheel, whereby the turbine wheel and/or the pump wheel are provided with axial bearings opposite the stator.

BACKGROUND INFORMATION

A hydrokinetic torque converter, such as that discussed above, is disclosed in German Laid Open Patent Application DE-OS 38 23 210. During operation, such torque converters are generally exposed to a high static and dynamic pressure load, which tends to result in the axial expansion of the components. Under some conditions, this axial load can cause the bearing elements (axial bearings) used to fall out of their centering or mounting, and can even result in total failure. This damage occurs most frequently to the axial bearing between the pump wheel and the stator.

OBJECT OF THE INVENTION

The object of the invention is to improve a torque converter of the type described above so that a simple, economical and easy-to-manufacture arrangement of the axial bearings is created, preferably without the requirement for complex and expensive machining of the pump hub and of the thrust washer.

SUMMARY OF THE INVENTION

The invention teaches that this object can be achieved if the walls of the turbine wheel and/or of the pump wheel, which are pressurized by axial pressure, are preferably provided on their radially inside diameter with mountings for fixing the axial bearings.

One advantage of this configuration is that, with an appropriate structural and geometric configuration of the turbine wheel and/or of the pump wheel, a reliable mounting of the axial bearings can preferably be created. Complex securing measures between the hubs and the thrust washers then become essentially unnecessary. An additional advantage is that the mountings are preferably made of the same unmachined part, so that only the waste in the radially inner area is reduced.

In other words, according to at least one embodiment of the present invention, the mountings can be formed from the same unmachined part as the hub of the output shaft.

In one embodiment which can be manufactured economically, at least one mounting is located directly in the housing wall away from the drive. By means of an appropriate shaping or structural geometry, the axial bearing can preferably be fixed in a corresponding mounting.

In one geometrically favorable embodiment, at least one mounting for the bearing is preferably located in the wall of the turbine wheel.

In an additional favorable embodiment, the mounting for the bearing preferably is an area offset or angled by approximately 90 degrees which runs toward the stator.

An advantageous feature of the invention is that there is preferably an outer shell which fits the respective wall, preferably of the pump wheel, and which outer shell contains the mounting for the bearings.

In an additional configuration, the axial bearing is preferably secured in the mounting.

In one configuration of the invention, the blades, preferably of the pump wheel arid the turbine wheel are preferably located in the outer shell.

In an embodiment which is relatively easy to manufacture, the outer shell is preferably connected to the housing wall away from the drive by welding, adhesive, etc.

One aspect of the invention resides broadly in a hydrokinetic torque converter, such as for a motor vehicle, the torque converter comprising: a power output shaft; a pump wheel, the pump wheel comprising: a pump wall; the pump wall comprising a first inner portion; the first inner portion for being disposed adjacent to the power output shaft; a plurality of blades; the pump wheel being connected to a source for providing power; a turbine wheel, the turbine wheel comprising: a turbine wall; the turbine wall comprising a second inner portion; the second inner portion for being disposed adjacent to the power output shaft; a plurality of blades; the plurality of blades of the pump wheel and the plurality of blades of the turbine wheel being disposed to face one another; the turbine wheel being disposed adjacent to the pump wheel; the turbine wheel being connected to and for driving the output shaft; stator means, the stator means being disposed between the turbine wheel and the pump wheel; at least a first and a second bearing; the first inner portion comprising first mounting means for mounting the first bearing on the pump wall; the first bearing being mounted on the first mounting means; the second inner portion comprising second mounting means for mounting the second bearing on the turbine wall; and the second bearing being mounted on the second mounting means.

Another aspect of the invention resides broadly in a hydrokinetic torque converter, such as for a motor vehicle, the torque converter comprising: a power output shaft; a pump wheel, the pump wheel comprising: a pump wall; the pump wall comprising a first inner portion; the first inner portion for being disposed adjacent to the power output shaft; a plurality of blades; the pump wheel being connected to a source for providing power; a turbine wheel, the turbine wheel comprising: a turbine wall; the turbine wall comprising a second inner portion; the second inner portion for being disposed adjacent to the power output shaft; a plurality of blades; the plurality of blades of the pump wheel and the plurality of blades of the turbine wheel being disposed to face one another; the turbine wheel being disposed adjacent to the pump wheel; the turbine wheel being connected to and for driving the output shaft; stator means, the stator means being disposed between the turbine wheel and the pump wheel; at least one bearing; the first inner portion comprising first mounting means for mounting the at least one bearing on the pump wall; and the at least one bearing being mounted on the first mounting means.

Yet another aspect of the invention resides broadly in a hydrokinetic torque converter, such as for a motor vehicle, the torque converter comprising: a power output shaft; a pump wheel, the pump wheel comprising: a pump wall; the pump wall comprising a first inner portion; the first inner portion for being disposed adjacent to the power output shaft; a plurality of blades; the pump wheel being connected to a source for providing power; a turbine wheel, the turbine wheel comprising: a turbine wall; the turbine wall comprising a second inner portion; the second inner portion for being disposed adjacent to the power output shaft; a plurality of blades; the plurality of Blades of the pump wheel and the plurality of blades of the turbine wheel being disposed to face one another; the turbine wheel being disposed adjacent to the pump wheel; the turbine wheel being connected to and for driving the output shaft, stator means, the stator means being disposed between the turbine wheel and the pump wheel; at least one bearing; the second inner portion comprising second mounting means for mounting the at least one bearing on the turbine wall; and the at least one bearing being mounted on the second mounting means.

BRIEF DESCRIPTION OF THE DRAWINGS

Preferred embodiments of the invention are schematically illustrated in the accompanying drawings in which:

FIG. 2 shows an enlarged portion of FIG. 1a; and

DESCRIPTION OF THE PREFERRED EMBODIMENT

Figure 1A:
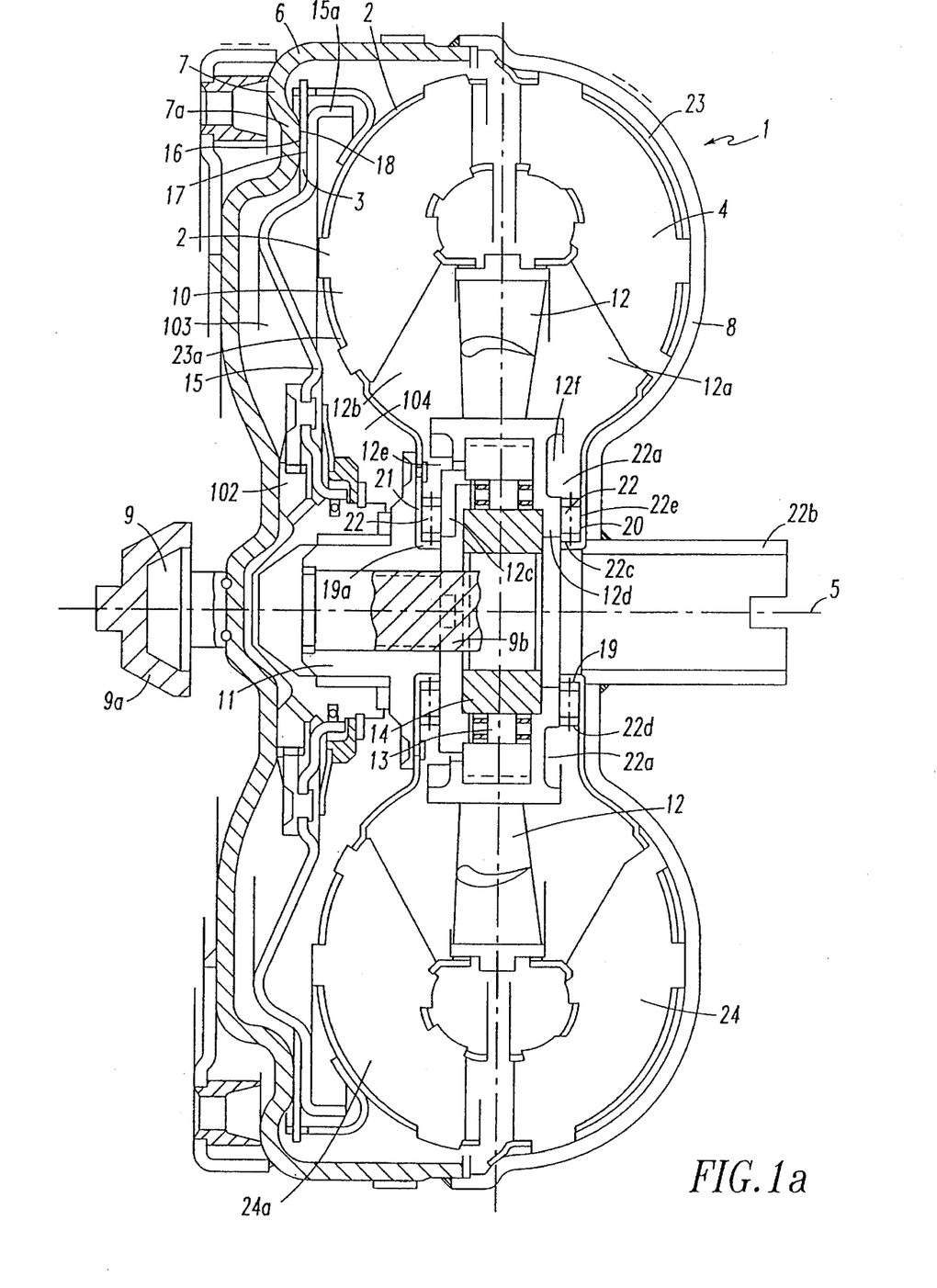
FIG. 1a shows a longitudinal section through a hydrokinetic torque converter.

FIG. 1 shows a longitudinal section through a hydrokinetic torque converter 1 which is oriented concentric to an axis of rotation 5. The internal combustion engine (not shown) is preferably located on the left with regard to FIG. 1a, and can preferably be non-rotationally connected to the housing 6. The housing 6 can preferably include a housing wall 7 near the drive of the internal combustion engine and a housing wall 8 away from the drive. In a radially inner area of the housing wall 7, the housing wall 7 is preferably rigidly connected to a guide hub 9, which guide hub 9 is preferably guided radially by an extension in the flywheel or in the crankshaft 9a of an internal combustion engine. The housing wall 8 away from the drive is preferably combined with the pump wheel 4 of the hydrokinetic torque converter 1 into a single component. A turbine wheel 10 is preferably located between the pump wheel 4 and the housing wall 7 near the drive of the internal combustion engine. The turbine wheel 10 is preferably rigidly connected to a turbine wheel hub 11, which hub 11 is preferably located by means of gear teeth on an output shaft 96. Between the turbine wheel 10 and the pump wheel 4 there is preferably a stator 12, which stator 12 is preferably guided by means of a freewheel mechanism 13 and a blade wheel hub 14, which blade wheel hub 14 is preferably mounted by means of gear teeth on a tube (not shown).

In accordance with a preferred embodiment of the present invention, there can preferably be spaces 12a and 12b, as shown in FIG. 1a, which space 12a can be located between the pump wheel 4 and the stator 12, and which space 12b can be located between the turbine wheel 10 and the stator 12.

The piston 15 of the lock-up clutch 16 is preferably located between the turbine wheel 10 and the housing wall 7 near the drive of the internal combustion engine. The piston 15, in the vicinity of its outside diameter pointing away from the housing wall 7, is preferably provided with a reinforcement collar 15a and with a friction surface 17, which friction surface 17 preferably faces the housing wall 7. Near this portion of the diameter of the piston 15, on the inside of the housing wall 7, there is preferably an additional friction surface 18. Preferably, friction surface 18 is opposite the friction surface 17 of the piston 15. Between the two friction surfaces 17 and 18 there is preferably a friction plate 3, which friction plate 3 preferably extends radially outward beyond the piston 15, where the friction plate 3 is preferably connected essentially non-rotationally to the turbine wheel 10.

The connection between the friction plate 3 and the turbine wheel 10 is preferably analogous to, or substantially identical to that disclosed in U.S. Pat. No. 4,926,988, which issued to Kundermann on May 22, 1990, entitled "Hydrodynamic Clutch".

In accordance with at least one embodiment of the present invention, the housing wall 7 preferably has an indented portion 7a. Indented portion 7a can preferably be indented towards the turbine wheel 10, Further, friction surface 18 can preferably be disposed on indented portion 7a.

In accordance with an additional embodiment of the present invention, the blade wheel hub 14, or possibly the freewheel mechanism 13 or the stator 12, preferably has portions 12c and 12d. Portion 12c can preferably be disposed adjacent bearing 22 on the turbine wheel 10 side, and portion 12d can preferably be disposed adjacent bearing 22 on the pump wheel 4 side. Further, recessed portions 12e and 12f (see FIG. 1a) can preferably be disposed radially outside of portions 12c and 12f, respectively. By configuring the stator 12 to have portions 12e and 12f, more converter fluid preferably from the pump wheel 4 and the turbine wheel 10 can preferably come in contact with the bearings 22.

Axial bearings 22 are preferably located in the radially inner area both of the pump wheel 4 and of the turbine wheel 10. The mountings 20 and 21 for the bearings 22 each preferably have a flange 19, 19a respectively. Flange 19, according to at least one preferred embodiment of the present invention, is preferably a component of an outer shell 23 of the pump wheel 4. Flange 19a is preferably a component of an outer shell 23a of the turbine wheel 10. In accordance with such a design, the axial bearings 22 can also preferably move in the axial direction, as a function of the tolerances involved, when exposed to static and dynamic pressure.

In at least one embodiment of the present invention, outer shell 23 preferably surrounds blades 24 of the pump wheel 4, and outer shell 23a surrounds blades 24a of the turbine wheel 10. The outer shell 23 can preferably be disposed immediately adjacent to, and essentially follow the inner contour of, housing wall 8, and can preferably be suitably secured or connected to housing wall 8, such as by welding. Further, turbine wall 2, in at least one embodiment of the present invention, is preferably a component of outer shell 23a.

The flanges 19, 19a of mountings 20, 21, in at least one embodiment of the present invention, can preferably serve as a concentric guide for the bearings 22. Further, the flanges 19, 19a can preferably be in contact with the innermost circumferential surface 22c of the bearings 22, this circumferential surface 22c preferably being disposed in a direction substantially parallel to the axis of rotation 5. Further, the flanges 19, 19a can preferably extend axially from their respective outer shells 23, 23a towards the stator 12. Thus, an angle A (see FIG. 2) of approximately 90° can preferably be formed between the outer shells 23, 23a and their respective flanges 19, 19a.

Figure 2:
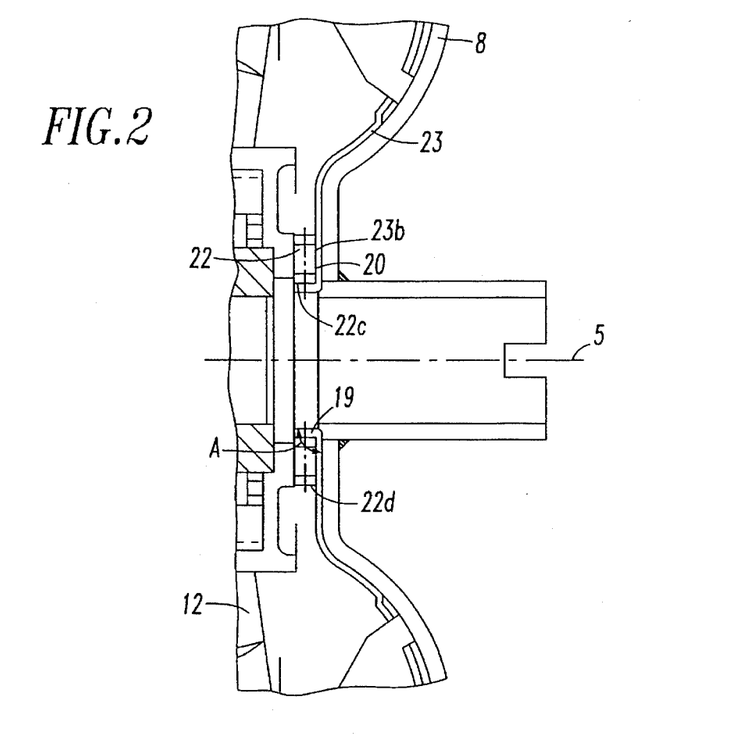

The flanges 19, 19a can have an essentially continuous circumference. However, if increased cooling of the bearings 22 is desired, the flanges 19, 19a can preferably be machined or casted to include radial and/or axial grooves or slots, which slots could possibly aid in cooling and/or lubricating the bearings 22 during operation by permitting converter fluid to come in contact with additional surfaces of the bearings 22.

In accordance with an additional embodiment of the present invention, the bearings 22 are preferably exposed to converter fluid in radially outward areas 22a (see FIG. 1a). Essentially, this feature may represent a substantial improvement over torque converters of the past, which essentially had bearings which were, in some cases, typically secured in these radially outward areas 22a by a type of flange or lip structure possibly located on the stator 12 or stator hub. Since the bearings 22 can experience a substantial increase in temperature during operation of the torque converter 1, the open areas 22a, which preferably allow converter fluid to come into contact with the bearings 22, can play a substantial role in cooling the bearings 22. This cooling can preferably prevent unnecessary wear or possibly even failure of the bearings 22.

It is also believed that the elimination of a securing flange or lip in the radially outward areas 22a of the bearings 22, as discussed above, can also contribute to less wear along the outermost circumferential surface 22d (see FIG. 1a) of the bearings 22, because the outermost circumferential surface 22d of the bearings 22, in at least one embodiment of the present invention, are essentially only in contact with converter fluid. Thus, the friction forces on this part 22d of the bearings 22 can eliminated, or at least significantly reduced, as a result.

FIG. 2 shows an enlarged portion of FIG. 1a in the vicinity of the of the bearings 22 and the flange 19. In accordance with at least one embodiment of the present invention as shown in FIG. 2, the flange 19 of the outer shell 23 can preferably extend in a substantially axial direction towards the stator 12. Thus, as discussed above, the flange 19 can preferably be disposed at an angle of about 90° with respect to a portion 23b of outer shell 23. In an alternative embodiment of the present invention, the flange 19 could conceivably be disposed at a greater or lesser angle than 90°.

As also discussed above, the flanges 19, 19a of mountings 20 and 21, in at least one embodiment of the present invention, are preferably incorporated into the outer shells 23, 23a of the pump wheel 4 and the turbine wheel 10, respectively. In torque converters of the past, these flanges 19, 19a may typically have been incorporated into the stator 12, or possibly the guide hubs of the pump wheel 4, stator 12 or the turbine wheel 10. Comparatively, one distinct advantage of the design of the present invention may be found in that, by moving at least the bearing 22 of the pump wheel 4 axially outwardly and closer to housing wall 8 and away from the stator 12, any excess heat accumulated in and around the bearing 22 can be conducted away from the bearing 22, essentially into the output shaft 22b of the pump wheel 4, into the outer shell 23, and also possibly into the housing wall 8. Further, by incorporating the bearing 22 of the turbine wheel 10 into the outer shell 23a of the turbine wheel 10 and away from the stator 12, the excess heat accumulated in and around this bearing 22 can be conducted away from the bearing 22, and essentially into the outer shells 23, 23a. Still further, with regard to the bearing 22 nearest housing wall 8, by configuring outer shell 23 in accordance with the present invention, it may be possible to make outer shell 23 thinner as compared to torque converters of the past, thus permitting an even more rapid conduction of heat from the bearings 22 into housing wall 8.

Thus, in accordance with at least one embodiment of the present invention, and with regard to both of the bearings 22 of the pump wheel 4 and the turbine wheel 10, better heat transfer can preferably be achieved between the outer radial circumferential surface 22e of the bearings 22 (which surface 22e faces housing 8 as shown in FIG. 2), and the outer shells 23, 23a of the pump wheel 4 and the turbine wheel 10. Thus, by conducting at least some heat out of and away from the bearings 22, axial expansion and possibly axial contraction of the bearings 22 can preferably be reduced. Further, by reducing the axial expansion and contraction of the bearings 22, due to excessive heating of the bearings 22 during operation, the bearings 22 may have a better chance of remaining correctly positioned in their respective mountings 20, 21.

As mentioned hereinabove, the bearings 22 can preferably move in the axial direction, and possibly in the radial direction, as a function of the manufacturing tolerances involved. Typical manufacturing tolerances of the bearings 22 may have a magnitude on the order of 1.000"±0.0001, 1.000"±0.0002, 1.00041 ± 0.0003, 1.000"±0.0004, 1.000"±0.0005, 1.000"±0.0006, 1.000"±0.0007, 1.000"±0.0008, 1.000"±0.0009, or 1.000" ±0.001, as expressed in inches. Of course, the manufacturing tolerances of the bearings 22 are not to be limited to the range of manufacturing tolerances listed above, and therefore the bearings 22 may have manufacturing tolerances of a lesser magnitude than the smallest magnitude listed above, or alternatively, may have manufacturing tolerances of a greater magnitude than the greatest magnitude listed above, such as one order of magnitude less than the smallest magnitude listed above, or one order magnitude greater than the largest magnitude listed above.

Since the bearings 22 can expand or contract during operation due to heat, this expansion or contraction should typically be accounted for, in conjunction with the manufacturing tolerances of the bearings 22, when forming the mountings 20 and 21, in order to keep the bearings 22 positioned correctly within the mountings 20, 21. Since the bearings 22 can now be cooled more effectively and efficiently, as discussed above, the expansion of the bearings 22 can essentially be substantially reduced, and thus the total tolerance of the bearings 22 can possibly be made smaller, whereby a tighter tolerance can be utilized or, alternatively, since the temperature changes may be decreased, as discussed above, the tolerance could be increased, whereby a looser tolerance could be utilized. A looser tolerance can then essentially result in lower manufacturing costs. The structural aspects of the torque converter 1 shown in FIG. 1a, with exception to the bearings 22, mountings 20, 21, and immediate surrounding structures, can be considered to be similar to the structural aspects of the torque converter disclosed in German Laid Open Patent Application DE-OS 38 23 210, which corresponds to U.S. Pat. No. 4,926,988 which issued to Kundermann on May 22, 1990, entitled "Hydrodynamic Clutch".

According to an alternative embodiment of the present invention, the flanges 19, 19a could preferably be eliminated. Thus, in addition to open areas 22a, there could preferably be additional open areas (not shown) in the vicinity of the innermost circumferential surfaces 22c of the bearings 22.

Figure 3:
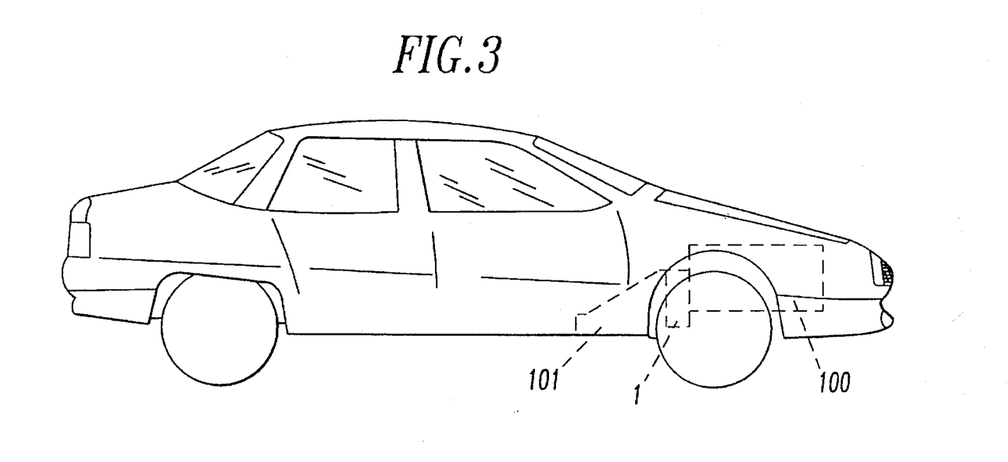
FIG. 3 shows a typical motor vehicle which incorporates the present invention.

FIG. 3 shows what could be considered to be a typical motor vehicle. Such a motor vehicle will generally include an internal combustion engine 100 mounted in a forward portion thereof. The motor vehicle will also typically include a transmission 101, and a drive shaft (not shown) for transmitting mechanical power generated by the engine 100 to the wheels. Further, if the transmission 101 is an automatic transmission, the drive train will also typically include a torque converter 1, for engaging the engine 100 with the transmission 101.

For informational purposes, the functioning of the lockup clutch 16 in the torque converter 1 can generally be described as follows.

Preferably, during torque transmission from the pump wheel 4 to the turbine wheel 10, the lockup clutch 16 can be opened by converter fluid being admitted under pressure, via a duct 102 into space 103. This space 103 is preferably located between the housing wall 7 and the piston 15. This admission of fluid can cause the piston 15 to be displaced axially towards the turbine wheel 10. As a consequence of the axial displacement of the piston 15 towards the turbine wheel 10, the friction plate 3 can be disposed freely between friction surfaces 17 and 18 (i.e. the friction plate 3 will preferably not have any substantial contact with friction surfaces 17 and 18), and the friction plate 3 can, in at least one embodiment of the present invention, preferably revolve freely with the turbine wheel 10, thus disengaging the lockup clutch 16.

In order to engage the lockup clutch 16, an internal space 104 of the torque converter 1 can preferably be pressurized by connecting internal space 104 to the delivery side of a converter fluid pump (not shown). The internal space 103 between the housing wall 7 and the piston 15 can be relieved of pressure via the duct 102, so that a pressure difference can be produced. This pressure difference can then preferably cause the piston 15 to move preferably towards the housing wall 7, which would be to the left in FIG. 1a. This movement by the piston 15 towards the housing wall 7 can then cause the friction surfaces 17 and 18 to preferably clamp the friction plate 3 between them, and thus engage the lockup clutch 16. During this engagement of the lockup clutch 16, sealing can take place at the friction surfaces 17 and 18, so that pressure in the torque converter 1 can preferably automatically build up.

Further, the present invention may operate in a manner analogous to the torque converter disclosed in U.S. Pat. No. 4,926,988, cited previously herein.

One feature of the invention resides broadly in the hydrokinetic torque converter 1, consisting of a housing driven by an internal combustion engine with a housing wall near the drive which is provided with a concentric guide hub, a pump wheel integrated into the housing wall away from the driver a turbine wheel located between the pump wheel and the housing wall near the drive, which turbine wheel is non-rotationally connected by means of a turbine wheel hub to the output, possibly a stator located between the two, whereby the turbine wheel and/or the pump wheel are provided with axial bearings opposite the stator, characterized by the fact that the walls of the pump wheel 4 and/or of the turbine wheel 10 pressurized with axial pressure are provided on their radially inside diameter with mountings 20, 21 for fastening the axial bearings 22.

Another feature of the invention resides broadly in the torque converter 1 characterized by the fact that the mounting 20, 21 is located directly in the housing wall 8 away from the drive.

Yet another feature of the invention resides broadly in the torque converter 1 characterized by the fact that the mounting is located in the wall 2 of the turbine wheel 10.

Still another feature of the invention resides broadly in the torque converter 1 characterized by the fact that an area is provided for the mounting 20, 21, which area is offset and which runs toward the stator 12.

A further feature of the invention resides broadly in the torque converter 1 characterized by the fact that there is an outer shell 23 which fits the respective wall 8, and which has the mounting 20, 21.

Another feature of the invention resides broadly in the torque converter 1 characterized by the fact that the axial bearing 22 is secured in the mounting 20, 21.

Yet another feature of the invention resides broadly in the torque converter 1 characterized by the fact that the blades 24 are located in the outer shell 23.

Still another feature of the invention resides broadly in the torque converter 1 characterized by the fact that the outer shell 23 is connected to the wall 8 by welding, adhesive, etc.

Types of torque converters and components therefor, which may be utilized in accordance with the embodiments of the present invention may be found in the following U.S. Pat. Nos. 4,478,323 to Weissenberger on Oct. 23, 1984, entitled "Hydrodynamic Clutch with Torsional Vibration Damping"; 4,437,551 to Gimmler on Mar. 20, 1984, entitled "Hydrodynamic Torque Converter"; No. 5,065,853 to Fujimoto et al. on Nov. 19, 1991, entitled "Lockup Clutch of Torque Converter"; 4,468,989 to Rosen on Sep. 4, 1984, entitled "Power Transmission Mechanism with a Hydrokinetic Torque Converter Having a Lockup Clutch"; 4,382,496 to Yamamori et al. on May 10, 1983, entitled "Torque Converter with Lockup Clutch Unit"; and 4,071,125 to Jameson on Jan. 31, 1978, entitled "Power Transmission with Torque Converter Lockup Clutch".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if any, described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 43 20 769.3, filed on Jun. 23, 1993, having inventors Bernd Schöder, Johannes Sossnihza, Jürgen Demgensky, Fosef Riedmann, Horst Jüdicke and Wilfred Glock, and DE-OS P 43 20 769.3 and DE-PS P 43 20 769.3, as well as their published equivalents, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A hydrokinetic torque converter for a motor vehicle, said torque converter comprising:

a power output shaft;

a housing for being driven by a source for providing power;

a pump wheel, said pump wheel comprising:
   a pump wall disposed adjacent said housing, said pump wall being a separate component from said housing;

said pump wall comprising a first inner portion;
said first inner portion for being disposed adjacent to said power output shaft;
a plurality of blades;
said pump wheel being non-rotatably connected to said housing;
a turbine wheel, said turbine wheel comprising:
a turbine wall;
said turbine wall comprising a second inner portion;
said second inner portion for being disposed adjacent to said power output shaft;
a plurality of blades;
said plurality of blades of said pump wheel and said plurality of blades of said turbine wheel being disposed to face one another;
said turbine wheel being disposed adjacent to said pump wheel;
said turbine wheel being connected to and for driving said power output shaft;
stator means, said stator means being disposed between said turbine wheel and said pump wheel;
at least one bearing;
said first inner portion of said pump wall comprising pump wall mounting means for mounting said at least one bearing on said pump wall; and
said at least one bearing being mounted on said pump wall mounting means.

2. The torque converter according to claim 1 wherein a substantial portion of said pump wall substantially conforms to a portion of said housing.

3. The torque converter according to claim 2 wherein:
said torque converter defines a longitudinal axis, said torque converter being disposed concentrically about said longitudinal axis;
said power output shaft is disposed along said longitudinal axis;
said first inner portion of said pump wall comprises:
an inner circumference disposed concentrically about said power output shaft and radially from said longitudinal axis;
said pump wall mounting means is disposed at said inner circumference of said first inner portion, said at least one bearing being secured on said pump wall mounting means; and
said pump wall mounting means comprises a flange extending from said pump wall towards said stator means, said flange being disposed substantially parallel to said longitudinal axis.

4. The torque converter according to claim 3 wherein:
said at least one bearing has a width defined parallel to said longitudinal axis;
said at least one bearing comprises an outer circumferential surface disposed parallel to and about said longitudinal axis, and radially from said longitudinal axis;
a substantially open area is disposed radially outward from, and adjacent to, said outer circumferential surface of said at least one bearing;
said substantially open area having means for permitting substantially unobstructed radial flow of converter fluid from said plurality of blades of said pump wheel to said outer circumferential surface of said at least one bearing, to cool said at least one bearing; and
said substantially open area having a width defined between said pump wall and said stator means, said width of said substantially open area being substantially greater than a substantial portion of said width of said at least one bearing.

5. The torque converter according to claim 4 wherein:
said stator means comprises:
a stator, said stator comprising;
a stator portion;
said stator portion is disposed immediately adjacent said at least one bearing;
said stator portion extends radially outwardly from, and substantially perpendicular to, said longitudinal axis, at least to said outer circumferential surface of said at least one bearing;
a recessed portion disposed radially outwardly from said stator portion; and
said recessed portion is disposed inwardly in said stator towards said turbine wheel, said substantially open area comprising said recessed portion of said stator.

6. The torque converter according to claim 5 wherein:
said at least one bearing comprises a first bearing and a second bearing;
said second inner portion of said turbine wall comprises turbine wall mounting means for mounting said second bearing on said turbine wall, said second inner portion and said turbine wall mounting means comprising one integral, homogeneous piece;
said second bearing being mounted on said turbine wall mounting means;
said second inner portion of said turbine wall further comprises:
an inner circumference disposed substantially concentrically about said power output shaft, and radially from said longitudinal axis; and
said turbine wall mounting means is disposed at said inner circumference of said second inner portion, said second bearing being secured on said turbine wall mounting means;
said turbine wall mounting means comprises a flange extending from said turbine wall towards said stator, said flange of said turbine wall mounting means being disposed substantially parallel to said longitudinal axis;
said substantially open area is a first open area;
said second bearing has a width defined parallel to said longitudinal axis;
said second bearing comprises an outer circumferential surface disposed substantially parallel to and about said longitudinal axis, and radially from said longitudinal axis;
a second substantially open area is disposed radially outward from, and adjacent to, said outer circumferential surface of said second bearing;
said second substantially open area having means for permitting substantially unobstructed radial flow of converter fluid from said plurality of blades of said turbine wheel to said outer circumferential surface of said second bearing, to cool said second bearing;
said second open area having a width defined between said turbine wall and said stator;
said stator portion is a first stator portion;
said recessed portion is a first recessed portion;
said stator further comprises:
a second stator portion disposed immediately adjacent said second bearing;
said second stator portion extends radially outwardly from and substantially perpendicular to said longitudinal axis, at least to said outer circumferential surface of said second bearing;

a second recessed portion disposed radially outwardly from said second stator portion;

said second recessed portion is disposed inwardly in said stator towards said pump wheel, said second substantially open area comprising said second recessed portion of said stator;

said width of said first open area being substantially greater than the entire extent of said width of said first bearing;

said width of said second open area being greater than said width of said second bearing;

said width of said first open area being substantially greater than said width of said second open area;

said flange of said pump wall mounting means is disposed at an angle of about 90° with respect to said first inner portion of said pump wall;

said flange of said turbine wall mounting means is disposed at an angle of about 90° with respect to said second inner portion of said turbine wall;

said pump wall is disposed about said plurality of blades of said pump wheel and said turbine wall is disposed about said plurality of blades of said turbine wheel; said housing comprises:

a first wall portion, said first wall portion being disposed immediately adjacent said pump wall, said first wall portion of said housing comprising said portion of said housing conforming to said substantial portion of said pump wall;

a second wall portion;

said second wall portion is disposed at an axial distance from said first wall portion;

said second wall portion having means for being disposed adjacent to said source for providing power;

said substantial portion of said pump wall being connected to said first wall portion of said housing by one of: a weld and an adhesive;

said torque converter further comprises:

a lockup clutch disposed between said second wall portion and said turbine wheel;

said lockup clutch comprising:

at least one friction plate disposed between said turbine wheel and said second wall portion;

said at least one friction plate being configured to make contact with said second wall portion during engagement of said lockup clutch;

a piston disposed between said turbine wheel and said at least one friction plate;

said piston comprising:

an outer portion disposed radially away from said longitudinal axis;

a collar disposed at said outer portion of said piston, said collar extending in a direction substantially parallel to said longitudinal axis, from said piston towards said pump wheel;

said outer portion comprises a friction surface disposed to face towards said second wall portion and to contact said friction plate when said lockup clutch is engaged;

said source for providing power comprises an internal combustion engine having a crankshaft;

said second wall portion of said housing comprises a guide hub;

said turbine wheel further comprises a turbine wheel hub disposed on said power output shaft, said turbine wheel and said turbine wheel hub both being non-rotatably attached to said power output shaft;

said second wall portion of said housing comprises a friction surface disposed to face towards said friction surface of said piston and to contact said friction plate when said lockup clutch is engaged;

said torque converter further comprises:

a first substantially open portion disposed between said piston and said second wall portion of said housing;

a second substantially open portion disposed between said piston and said turbine wheel;

said first substantially open portion comprises first means for permitting flow of converter fluid;

said second substantially open portion comprises second means for permitting flow of converter fluid;

said second wall portion of said housing comprises an indented portion disposed adjacent said friction plate, said indented portion being indented towards said pump wheel; and said indented portion comprises said friction surface of said second wall portion of said housing.

7. A hydrokinetic torque converter for a motor vehicle, said torque converter comprising:

a power output shaft;

a pump wheel, said pump wheel comprising:

a pump wall;

said pump wall comprising a first inner portion;

said first inner portion for being disposed adjacent to said power output shaft;

a plurality of blades;

said pump wheel being non-rotatably connected to a source for providing power;

a turbine wheel, said turbine wheel comprising:

a turbine wall;

said turbine wall comprising:

a second inner portion;

an outer portion disposed radially away from said second inner portion;

said second inner portion for being disposed adjacent to said power output shaft;

a plurality of blades;

said plurality of blades of said pump wheel and said plurality of blades of said turbine wheel being disposed to face one another;

said turbine wheel being disposed adjacent to said pump wheel;

said turbine wheel being connected to and for driving said output shaft;

stator means, said stator means being disposed between said turbine wheel and said pump wheel;

at least one bearing;

said second inner portion of said turbine wall comprising turbine wall mounting means for mounting said at least one bearing on said turbine wall;

said outer portion, said second inner portion and said turbine wall mounting means together comprising one integral, homogeneous piece; and said at least one bearing being mounted on said turbine wall mounting means.

8. The torque converter according to claim 7 wherein:

said torque converter defines a longitudinal axis, said torque converter being disposed substantially concentrically about said longitudinal axis;

said power output shaft is disposed along said longitudinal axis;

said second inner portion of said turbine wall comprises:
   an inner circumference disposed substantially concentrically about said power output shaft, and radially from said longitudinal axis; and
   said turbine wall mounting means is disposed at said inner circumference of said second inner portion, said at least one bearing being secured on said turbine wall mounting means; said turbine wall mounting means comprises a flange extending from said turbine wall towards said stator means, said flange being disposed substantially parallel to said longitudinal axis.

9. The torque converter according to claim 8 wherein:
said at least one bearing has a width defined parallel to said longitudinal axis;
said at least one bearing comprises an outer circumferential surface disposed substantially parallel to and about said longitudinal axis, and radially from said longitudinal axis;
a substantially open area is disposed radially outward from, and adjacent to, said outer circumferential surface of said at least one bearing;
said substantially open area having means for permitting substantially unobstructed radial flow of converter fluid from said plurality of blades of said turbine wheel to said outer circumferential surface of said at least one bearing, to cool said at least one bearing; and
said substantially open area having a width defined between said turbine wall and said stator means, said width of said substantially open area being greater than a substantial portion of said width of said at least one bearing.

10. The torque converter according to claim 9 wherein:
said stator means comprises:
   a stator, said stator comprising:
      a stator portion disposed immediately adjacent said at least one bearing;
      said stator portion extends radially outwardly from, and substantially perpendicular to said longitudinal axis, at least to said outer circumferential surface of said at least one bearing;
      a recessed portion disposed radially outwardly from said stator portion; and
      said recessed portion is disposed inwardly in said stator towards said pump wheel, said substantially open area comprising said recessed portion.

11. The torque converter according to claim 10 wherein:
said at least one bearing comprises a first and a second bearing;
said first inner portion of said pump wall comprises pump wall mounting means for mounting said second bearing on said pump wall;
said second bearing being mounted on said pump wall mounting means;
said first inner portion of said pump wall comprises:
   an inner circumference disposed concentrically about said power output shaft, and radially from said longitudinal axis;
   said pump wall mounting means is disposed at said inner circumference of said first inner portion, said second bearing being secured on said pump wall mounting means;
said pump wall mounting means comprises a flange extending from said pump wall towards said stator means, said flange of said pump wall mounting means being disposed substantially parallel to said longitudinal axis;
said substantially open area is a first open area;
said second bearing has a width defined parallel to said longitudinal axis;
said second bearing comprises an outer circumferential surface disposed substantially parallel to and about said longitudinal axis, and radially from said longitudinal axis;
a second open area is disposed radially outward from, and adjacent to said outer circumferential surface of said second bearing;
said second substantially open area having means for permitting substantially unobstructed radial flow of converter fluid from said plurality of blades of said pump wheel to said outer circumferential surface of said second bearing, to cool said second bearing;
said second open area having a width defined between said pump wall and said stator;
said stator portion is a first stator portion;
said recessed portion is a first recessed portion; said stator further comprises:
   a second stator portion;
   said second stator portion is disposed immediately adjacent said second bearing;
   said second stator portion extends radially outwardly from, and substantially perpendicular to said longitudinal axis, at least to said outer circumferential surface of said second bearing;
   a second recessed portion disposed radially outwardly from said second stator portion;
   said second recessed portion is disposed inwardly in said stator towards said turbine wheel, said second substantially open area comprising said second recessed portion;
said torque converter further comprises a housing for being driven by said source for providing power;
said pump wheel being non-rotatably connected to said housing;
said width of said second open area being substantially greater than said width of said second bearing;
said width of said first open area being greater than the entire extent of said width of said first bearing;
said width of said second open area being substantially greater than said width of said first open area;
said flange of said pump wall mounting means is disposed at an angle of about 90° with respect to said first inner portion of said pump wall;
said flange of said turbine wall mounting means is disposed at an angle of about 90° with respect to said second inner portion of said turbine wall;
said pump wall is disposed about said plurality of blades of said pump wheel and said turbine wall is disposed about said plurality of blades of said turbine wheel;
said housing comprises:
   a first wall portion, said first wall portion being disposed immediately adjacent, and conforming to, said pump wall;
   a second wall portion;
   said second wall portion is disposed at an axial distance from said first wall portion;
   said second wall portion having means for being disposed adjacent to said source for providing power;
   said pump wall being connected to said first wall portion of said housing by one of: a weld and an adhesive;

said torque converter further comprises:
- a lockup clutch disposed between said second wall portion and said turbine wheel;
- said lockup clutch comprising:
  - at least one friction plate disposed between said turbine wheel and said second wall portion;
  - said at least one friction plate being configured to make contact with said second wall portion during engagement of said lockup clutch;
  - a piston disposed between said turbine wheel and said at least one friction plate;
  - said piston comprising:
    - an outer portion disposed radially away from said longitudinal axis;
    - a collar disposed at said outer portion of said piston, said collar extending in a direction substantially parallel to said longitudinal axis, from said piston towards said pump wheel;
    - said outer portion comprises a friction surface disposed to face towards said second wall portion and to contact said friction plate when said lockup clutch is engaged;
- said source for providing power comprises an internal combustion engine having a crankshaft;
- said second wall portion of said housing comprises a guide hub;
- said turbine wheel further comprises a turbine wheel hub disposed on said power output shaft, said turbine wheel and said turbine wheel hub both being non-rotatably attached to said power output shaft;
- said second wall portion of said housing comprises a friction surface disposed to face towards said friction surface of said piston and to contact said friction plate when said lockup clutch is engaged;
- said torque converter further comprises:
  - a first substantially open portion disposed between said piston and said second wall portion;
  - a second substantially open portion disposed between said piston and said turbine wheel;
  - said first substantially open portion comprises first means for permitting flow of converter fluid;
  - said second substantially open portion comprises second means for permitting flow of converter fluid;
- said second wall portion of said housing comprises an indented portion disposed adjacent said friction plate, said indented portion being indented towards said pump wheel; and
- said indented portion comprises said friction surface of said second wall portion of said housing.

12. A hydrokinetic torque converter for a motor vehicle, said torque converter comprising:
- a power output shaft, said power output shaft having a longitudinal axis and defining an axial direction parallel to said longitudinal axis;
- a pump wheel, said pump wheel comprising:
  - a pump wall;
  - said pump wall comprising a first inner portion;
  - said first inner portion for being disposed adjacent to said power output shaft;
  - a plurality of blades;
- said pump wheel being non-rotatably connected to a source for providing power;
- a turbine wheel, said turbine wheel comprising:
  - a turbine wall;
  - said turbine wall comprising a second inner portion;
  - said second inner portion for being disposed adjacent to said power output shaft;
  - a plurality of blades;
  - said plurality of blades of said pump wheel and said plurality of blades of said turbine wheel being disposed to face one another;
- said turbine wheel being disposed adjacent to said pump wheel;
- said turbine wheel being connected to and for driving said power output shaft;
- stator means, said stator means being disposed between said turbine wheel and said pump wheel;
- at least one bearing, said at least one bearing having a width defined parallel to said longitudinal axis;
- one of: said first inner portion and said second inner portion comprising means for mounting said at least one bearing on a corresponding one of: said pump wall and said turbine wall;
- said at least one bearing being mounted on said mounting means;
- a substantially open area disposed radially outwardly from, and adjacent to, said at least one bearing;
- said substantially open area having means for permitting substantially unobstructed radial flow of converter fluid from one of: said plurality of blades of said pump wheel and said plurality of blades of said turbine wheel to said at least one bearing, to cool said at least one bearing;
- said substantially open area having a width defined between one of:
  - said pump wall and said stator; and
  - said turbine wall and said stator;
- said width of said substantially open area being substantially greater than a substantial portion of said width of said at least one bearing.

13. The torque converter according to claim 12 wherein:
- said at least one bearing comprises a first bearing and a second bearing;
- said mounting means comprises pump wall mounting means and turbine wall mounting means;
- said first inner portion of said pump wall comprises:
  - an inner circumference disposed substantially concentrically about said power output shaft, and radially from said longitudinal axis;
  - said pump wall mounting means being disposed at said inner circumference of said first inner portion, said first bearing being secured on said pump wall mounting means;
- said second inner portion of said turbine wall comprises:
  - an inner circumference disposed substantially concentrically about said power output shaft, and radially from said longitudinal axis; and
  - said turbine wall mounting means being disposed at said inner circumference of said second inner portion, said second bearing being secured on said turbine wall mounting means.

14. The torque converter according to claim 13 wherein:
- said turbine wall mounting means comprises a flange extending from said pump wall towards said stator means, said flange being disposed substantially parallel to said longitudinal axis;
- said pump wall mounting means comprises a flange extending from said turbine wall towards said stator means, said flange being disposed substantially parallel to said longitudinal axis.

15. The torque converter according to claim 14 wherein:
said first bearing comprises an outer circumferential surface disposed substantially parallel to and about said longitudinal axis, and radially from said longitudinal axis;
a substantially open area is disposed radially outward from, and adjacent to, said outer circumferential surface of said first bearing;
said substantially open area having means for permitting substantially unobstructed radial flow of converter fluid from said plurality of blades of said pump wheel to said outer circumferential surface of said first bearing, to cool said first bearing; and
said first open area is disposed between said pump wall and said stator means.

16. The torque converter according to claim 15 wherein:
said second bearing comprises an outer circumferential surface disposed parallel to said longitudinal axis, and radially from said longitudinal axis;
said substantially open area is a first open area;
a second substantially open area is disposed radially outward from, and adjacent to, said outer circumferential surface of said second bearing;
said second substantially open area having means for permitting substantially unobstructed radial flow of converter fluid from said plurality of blades of said turbine wheel to said outer circumferential surface of said second bearing, to cool said second bearing; and
said second open area is disposed between said turbine wall and said stator means.

17. The torque converter according to claim 16 wherein:
said first bearing has a width defined parallel to said longitudinal axis;
said first open area has a width defined between said pump wall and said stator means, said width of said first open area being substantially greater than said width of said first bearing;
said second bearing has a width defined parallel to said longitudinal axis; and
said second open area has a width defined between said turbine wall and said stator means, said width of said second open area being greater than said width of said second bearing.

18. The torque converter according to claim 17 wherein said width of said first open area is substantially greater than said width of said second open area.

19. The torque converter according to claim 18 wherein:
said stator means comprises:
a stator, said stator comprising;
a first stator portion;
said first stator portion is disposed immediately adjacent said first bearing;
said first stator portion extends radially outwardly from, and substantially perpendicular to said longitudinal axis, at least to said outer circumferential surface of said first bearing;
a first recessed portion disposed radially outwardly from said first stator portion;
said first recessed portion is disposed inwardly in said stator towards said turbine wheel, said first open area comprises said first recessed portion;
a second stator portion disposed immediately adjacent said second bearing;
said second stator portion extends radially outwardly from, and substantially perpendicular to said longitudinal axis, at least to said outer circumferential surface of said second bearing;
a second recessed portion disposed radially outwardly from said second stator portion; and
said second recessed portion is disposed inwardly in said stator towards said pump wheel, said second open area comprising said second recessed portion.

20. The torque converter according to claim 19 wherein:
said turbine wall mounting means and said second inner portion together comprise one integral, homogeneous piece;
said flange of said pump wall mounting means is disposed at an angle of about 90° with respect to said first inner portion of said pump wall;
said flange of said turbine wall mounting means is disposed at an angle of about 90° with respect to said second inner portion of said turbine wall;
said pump wall is disposed about said plurality of blades of said pump wheel and said turbine wall is disposed about said plurality of blades of said turbine wheel;
said torque converter further comprises a housing for being driven by said source for providing power;
said pump wall is disposed adjacent said housing, said pump wall being a separate component from said housing;
said pump wheel is non-rotatably connected to said housing;
said housing comprises:
a first housing portion, said first housing portion being disposed immediately adjacent, and conforming to, a substantial portion of said pump wall;
a second wall portion;
said second wall portion is disposed at an axial distance from said first wall portion;
said second wall portion having means for being disposed adjacent to said source for providing power;
said substantial portion of said pump wall is connected to said first wall portion of said housing by one of: a weld and an adhesive;
said torque converter further comprises:
a lockup clutch disposed between said second wall portion and said turbine wheel;
said lockup clutch comprising:
at least one friction plate disposed between said turbine wheel and said second wall portion;
said at least one friction plate being configured to make contact with said second wall portion during engagement of said lockup clutch;
a piston disposed between said turbine wheel and said at least one friction plate;
said piston comprising:
an outer portion disposed radially away from said longitudinal axis;
a collar disposed at said outer portion of said piston, said collar extending in a direction substantially parallel to said longitudinal axis from said piston towards said pump wheel;
said outer portion comprises a friction surface disposed to face towards said second wall portion and to contact said friction plate when said lockup clutch is engaged;
said source for providing power comprises an internal combustion engine having a crankshaft;

said second wall portion comprises a guide hub;

said turbine wheel further comprises a turbine wheel hub disposed on said power output shaft, said turbine wheel and said turbine wheel hub both being non-rotatably attached to said power output shaft;

said second wall portion of said housing comprises a friction surface disposed to face towards said friction surface of said piston, and to contact said friction plate when said lockup clutch is engaged;

said torque converter further comprises:
 a first substantially open portion disposed between said piston and said second wall portion;
 a second substantially open portion disposed between said piston and said turbine wheel;

said first substantially open portion comprises first means for permitting flow of converter fluid;

said second substantially open portion comprises second means for permitting flow of converter fluid;

said second wall portion of said housing comprises an indented portion disposed adjacent said friction plate, said indented portion being indented towards said pump wheel; and said indented portion comprises said friction surface of said second wall portion of said housing.

* * * * *

UNITED STATES PATENT AND TRADEMARK OFFICE
CERTIFICATE OF CORRECTION

Page 1 of 2

PATENT NO. : 5,515,956
DATED : May 14, 1996
INVENTOR(S) : Bernd SCHÜDER, Johannes SOSSNITZA, Jürgen DEMGENSKY, Josef RIEDMANN, Horst JÄDICKE and Wilfried GLOCK It is certified that error appears in the above-indentified patent and that said Letters Patent is hereby corrected as shown below:

In column 3, line 9, after 'plurality of', delete "Blades" and insert --blades--.

In column 3, line 52, after 'shaft', delete "96." and insert --9b.--.

In column 5, line 64, before '23a.', delete "shells 23," and insert --shell--.

In column 6, line 23, after '1.000"±0.0002,', delete "1.00041" and insert --1.000"--.

In column 7, line 50, after the second occurrence of 'the', delete "driver" and insert --drive,--.

In column 8, line 48, after 'Johannes', delete "Sossnihza," and insert --Sossnitza,--.

In column 8, line 49, after 'Horst', delete "Jüdicke" and insert --Jädicke--.

UNITED STATES PATENT AND TRADEMARK OFFICE
CERTIFICATE OF CORRECTION

Page 2 of 2

PATENT NO.   : 5,515,956
DATED        : May 14, 1996
INVENTOR(S)  : Bernd SCHÖDER, Johannes SOSSNITZA, Jürgen DEMGENSKY, Josef RIEDMANN, Horst JÄDICKE and Wilfried GLOCK It is certified that error appears in the above-indentified patent and that said Letters Patent is hereby corrected as shown below:

In column 15, line 5, Claim 11, after 'plate', delete "dlsposed" and insert --disposed--.

Signed and Sealed this

Fourteenth Day of January, 1997

Attest:

BRUCE LEHMAN

Attesting Officer

Commissioner of Patents and Trademarks